Figures 1, 2, 3:
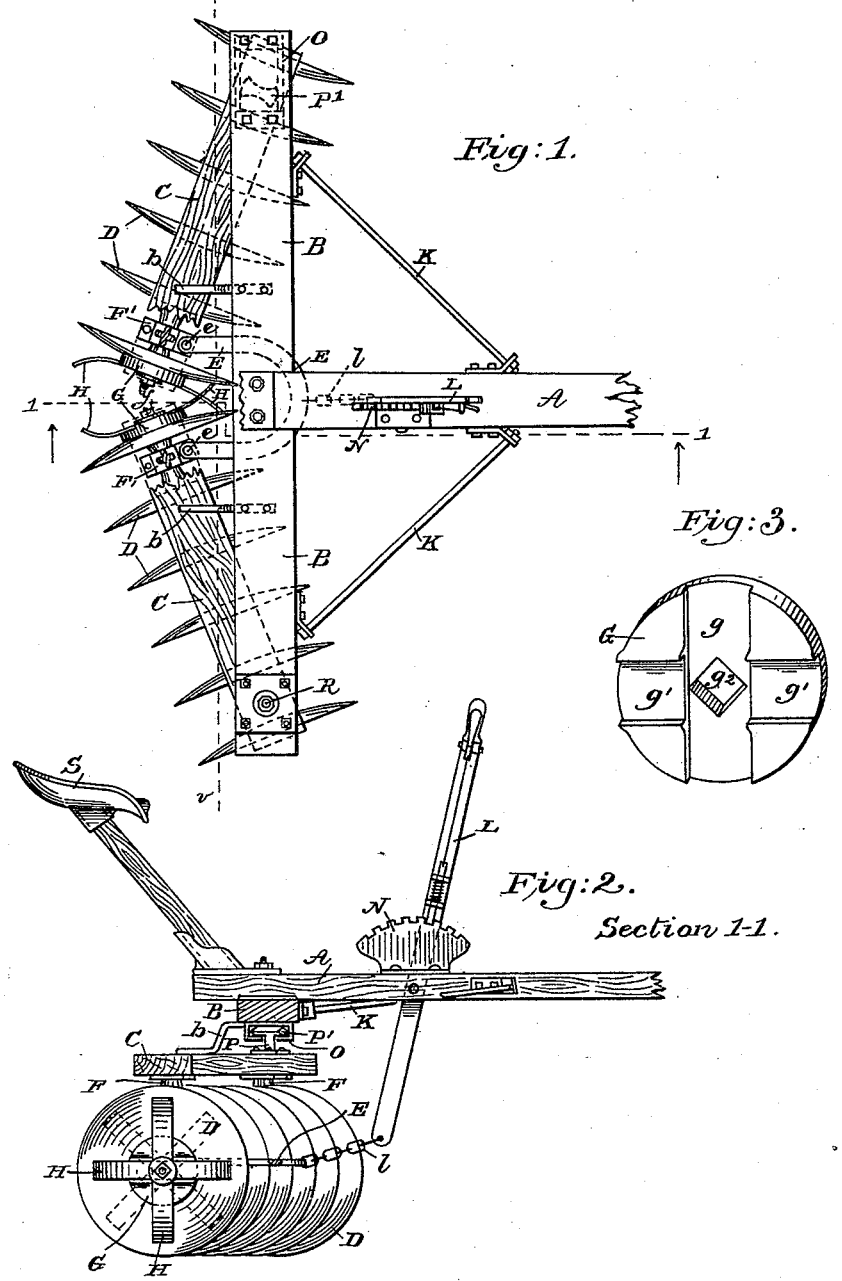

(No Model.) 2 Sheets—Sheet 1.

R. W. HARDIE.
DISK HARROW.

No. 478,596. Patented July 12, 1892.

Section 1-1.

WITNESSES:
John W. Fisher
Marvin Randolph

INVENTOR
Robert W. Hardie (No Model.) 2 Sheets—Sheet 2.
R. W. HARDIE.
DISK HARROW.
No. 478,596. Patented July 12, 1892.
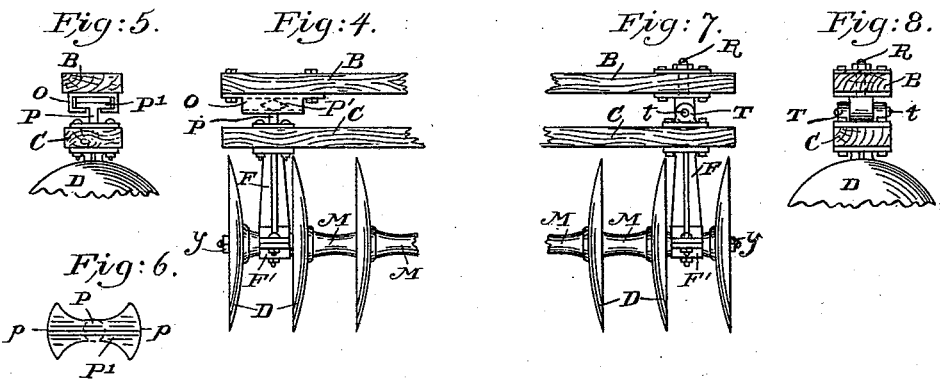
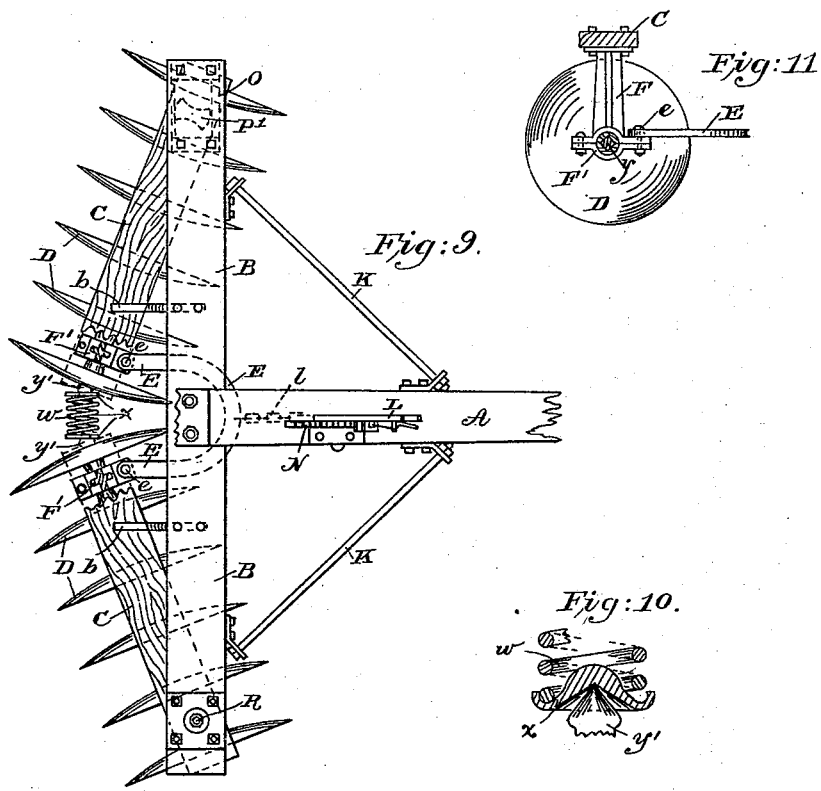
WITNESSES: John W. Fisher. Marion Randolph.
INVENTOR. Robert W. Hardie.

UNITED STATES PATENT OFFICE.

ROBERT W. HARDIE, OF ALBANY, NEW YORK.

DISK HARROW.

SPECIFICATION forming part of Letters Patent No. 478,596, dated July 12, 1892.

Application filed September 2, 1891. Serial No. 404,560. (No model.)

*To all whom it may concern:*

Be it known that I, ROBERT W. HARDIE, a citizen of the United States, residing at Albany, in the county of Albany and State of New York, have invented certain new and useful Improvements in Disk Harrows; and I do hereby declare the following to be a full, clear, and exact description of the invention, such as will enable others skilled in the art to which it appertains to make and use the same.

My invention has for its objects, first, to provide means for preventing lateral friction of the gangs when arranged obliquely to the line of draft; second, to provide means for cultivating the ground between the inner ends of the disk gangs. These objects I accomplish, first, by placing spring mechanism between the inner ends of the gangs; second, by securing plates or bars to the inner end of each gang adapted to bear against the inner disk of the opposing gang when arranged obliquely to the line of draft.

In the drawings, Figure 1 is a plan view of a disk-harrow embodying my invention. Fig. 2 is a vertical cross-section of the same, taken on line 1 1 of Fig. 1. Fig. 3 is a perspective view of a holding-plate. Fig. 4 is a rear view of one end of cross-bar and disk gang, showing an endwise-adjustable pivot. Fig. 5 is a side view of the pivot shown in Fig. 4, with end of cross-bar and gang-bar. Fig. 6 is a plan view of pivot-plate. Fig. 7 is a rear view of one end of a harrow. Fig. 8 is a side view of pivot shown in Fig. 7, with end of gang-bar and cross-bar. Fig. 9 is a plan view of a disk harrow, showing a modification of spring mechanism between the gangs. Fig. 10 is sectional view of a spring, a supporting flange or button, and the inner end of an axle. Fig. 11 is a side view of a disk-gang standard and yoke connecting the inner ends of the gangs.

As illustrated in the drawings, the main frame of the harrow consists of a pole A, having a cross-bar B secured rigidly to the pole and extending laterally therefrom, and brace-bars K, secured to the pole and cross-bar.

The disk gangs consist of a series of disks D, secured to an axle $y$ and separated from each other by means of spools of ordinary construction. The disk gangs are also provided with standards F, provided with bearing-boxes F′ on their lower ends and connected at their upper ends by means of a gang-bar C. One of the disk gangs is connected at its outer end to the main frame by means of a fixed pivot of any suitable construction, such as the vertical bolt or pin R, which rotates in its bearing in the cross-bar B to allow a backward and forward movement of the inner end of the gang. The lower end of said bolt is provided with an eye, which engages lugs or ears T, and is secured thereto by the hinge-pin $t$, by means of which the inner end of the gang may be moved vertically. The opposite disk gang is secured at its outer end to the main frame by a pivotal connection, which allows the gang to move bodily lengthwise.

In the construction shown herein, which may be modified, however, without departing from my invention, a pivot-pin P is secured to the gang-bar C and provided with a sector-plate P′, which engages a channel-iron O, secured to the cross-bar B. The upper and lower surfaces of the plate P′ are curved, as shown by dotted lines in Fig. 4, whereby the inner end of the gang is permitted to move vertically, and the ends $p$ of the plate are curved so as to have a direct bearing against the sides of the channel-iron O in a line at right angle to the cross-bar B when the gangs are arranged obliquely to the line of draft.

A holding-plate G is secured to the inner end of the axle $y$ in any suitable manner and provided with a square aperture $g^2$, which prevents the plate from turning on the axle. This plate is also provided with transverse recesses $g$ and $g'$, arranged crosswise of each other, and one recess is made deeper than the other. Bearing bars or plates H are secured within said recesses to the axle $y$ in the same manner as the plate G. These bars are preferably made of spring metal and extend outwardly from the end of the gang to which they are secured, and they may be made of such length that when the gangs are arranged at a working angle, as shown in Fig. 1, the ends of the bars have contact with the opposite disk in a line $v$ $v$, passing through a point midway of the length of the gangs and at right angle to the line of draft. The inner ends of the gangs may be connected together, if desired, by means of a yoke E or by other suitable means having similar capabilities. Stops b may be secured to the cross-bar B to prevent the inner ends of the gangs from rising above a horizontal position, but permit them to drop downward into a dead furrow.

The gangs are moved backward and forward by means of a lever L, mounted on the pole and secured in any desired position by a spring-actuated latch engaging a notched segment N. When the gangs of an ordinary disk harrow are moved backward, their inner ends travel in the arc of a circle, and thereby separate from each other, leaving a considerable portion of the ground uncultivated. In the construction shown herein, however, when the inner ends of the gangs are moved backward in the ordinary manner the pressure of the earth on the sides of the disks forces one of the gangs inward bodily until it assumes the desired position relatively to its opposing gang. During this operation the sector-plate P' slides lengthwise of the channel-iron O. When the inner ends of the gangs are connected by means of a yoke or other device, a backward movement of the gang having a fixed pivot causes a backward and inward bodily movement of its opposing gang.

The spring mechanism placed between the inner ends of the gangs prevents the gangs from being forced unduly inward toward a central longitudinal line, and thereby overcomes the pressure of the earth against the sides of the disks, which causes the gangs of an ordinary harrow to bear hard against the ends of the journal-boxes, thereby producing considerable friction and adding largely to the draft of the team.

The resilience of the bars H enables three of the bars to have contact with the forward portion of their opposing disks at the same time, thereby offering a steady and strong resistance to the inward pressure of the gangs, and the alternate arrangement of the bars of the opposing gangs allows one gang to aid the other in revolving and prevents it from slipping. These bars also cut up and cultivate the ridge of earth that remains between the inner ends of the gangs, and when made of resilient metal they spring back after being relieved of contact with the opposing gang with sufficient force to clean themselves of any grass or dirt that may adhere to them.

Instead of the spring mechanism shown in in Figs. 1 and 2, other forms may be used without departing from my invention, such as the spiral spring W, (shown in Figs. 9 and 10,) supported by flanges or buttons $x$, provided with a concave back, which engages the pointed end $y'$ of the axle $y$.

The yoke E may be omitted in some instances, especially when the spring mechanism is secured to the ends of the disk gangs, in the manner shown in Figs. 1 and 2.

I do not desire to be limited to the specific construction of any of the several parts constituting my invention, and I desire especially to claim, broadly, a disk harrow having spring mechanism of any suitable construction interposed between the inner ends of the gangs for the purpose of resisting the side pressure of the gangs.

What I claim is—

1. In a disk harrow, the combination, with a main frame, of disk gangs pivotally connected to said frame and spring mechanism secured between the inner ends of the gangs, substantially as shown and described.

2. In a disk harrow, the combination, with a main frame, of disk gangs pivoted to said frame and resilient bars secured to the inner end of each disk gang, arranged alternately with those of the opposing gang and adapted to bear against the inner disk of said opposing gang when arranged obliquely to the line of draft, substantially as shown and described.

In testimony whereof I affix my signature in presence of two witnesses.

ROBERT W. HARDIE.

Witnesses:
 CHAS. H. MILLS,
 CHARLES F. BRIDGE.